Patented July 5, 1949

2,475,437

UNITED STATES PATENT OFFICE 2,475,437

PHOSPHORESCENT PIGMENT

Ferdinand Stern, New York, N. Y.

No Drawing. Application March 9, 1948,
Serial No. 13,939

7 Claims. (Cl. 252—301.4)

This invention relates to phosphorescent pigments, especially of the alkaline earth metal sulfide type, and has for its object the provision of an improved alkaline earth metal sulfide phosphorescent pigment and particularly an improved calcium sulfide-strontium sulfide phosphorescent pigment.

The phosphorescent properties of pigments of the alkaline earth metals, particularly when appropriately activated, have long been recognized. For example, phosphors of calcium sulfide and strontium sulfide, and mixtures thereof, have heretofore been commonly activated by bismuth. I have discovered that the use of copper as an auxiliary activator with bismuth produces significant increases in the phosphorescent brightness of alkaline earth metal sulfide phosphors. These increases in phosphorescent brightness generally range between about 100 and 200% for the period of 30 minutes to 8 hours after excitation of the phosphor. The present invention, based on that discovery, involves an improved phosphorescent pigment of the alkaline earth metal sulfide type containing as activators minute amounts of both bismuth and copper.

The activation of the alkaline earth metal sulfide is commonly effected by muffling or otherwise suitably heat-treating at elevated temperature a mixture of the sulfide, or a plurality of the sulfides, and a minute amount of the activator in the form of a salt, such for example as bismuth nitrate. While it is customary to refer to the activator in the resulting phosphorescent pigment as "bismuth," it will be understood that the bismuth is not present in the elemental form but as a compound of bismuth resulting from the decomposition at elevated temperature of the bismuth salt in the presence of the alkaline earth metal sulfide and any flux, sulfur or reducing agent that may be mixed therewith.

The improved phosphorescent pigment of the invention is similarly made by heat treating at elevated temperature a mixture comprising an alkaline earth metal sulfide either as a single sulfide or as a plurality of such sulfides, and containing as activators minute amounts of both a bismuth salt and a copper salt. In addition to the activators, small amounts of fluxes, such, for example, as one or more alkali metal salts, sulfur and a reducing agent may be included in the mixture. The heat treatment is carried out in a non-oxidizing and preferably inert or slightly reducing atmosphere such, for example, as sulfur vapor from the added sulfur or carbon monoxide from the added reducing agent, and may be advantageously conducted in a retort or muffle externally heated to impart a temperature of 900 to 1300° C. to the mixture. At the lower end of this muffling temperature range a relatively long treating period is required, and, conversely, at the upper end of the temperature range the heating period must be relatively short and must be carried out with care to prevent damage to the pigment. In general, muffling temperatures within the range of 1000 to 1200° C. give particularly effective results. The heat treatment is continued for 1 to 2 hours, which is generally sufficient to effect the necessary diffusion of the activator throughout the pigment, and the resulting mixture is allowed to cool under non-oxidizing conditions, and is then carefully ground. The grinding should be relatively gentle in order to avoid destroying the phosphorescence by crushing. The heat treatment may advantageously be carried out in two stages of 40 to 60 minutes each with intermediate cooling and grinding.

Although the phosphorescent pigment of the invention may comprise a single alkaline earth metal sulfide, such as calcium sulfide or strontium sulfide, it is preferably composed for the most part of calcium sulfide and strontium sulfide in ratios varying from 80:20 to 20:80. Significant increases in phosphorescence are obtained from the copper activator, used in conjunction with the bismuth activator, even when the formulation of the phosphors is widely varied. Thus the ratios of crude calcium sulfide to crude strontium sulfide may be varied from 100:0 to 0:100 and significant improvement in the phosphorescent brightness will be obtained as a result of the inclusion of the copper activator along with the bismuth activator. Formulations based on the carbonates and oxides of calcium and strontium together with elemental sulfur also show improvement when copper is used as an activator in accordance with the invention.

Only a minute amount of each activator is included in the pigment, usually a few hundredths or less of one per cent of bismuth, and a few thousandths or less of one per cent of copper by weight being sufficient, the percentages being based on the weight of the alkaline earth metal sulfide or sulfides. For practical reasons it is more convenient and more accurate to express the minute amounts of the two activators included in the finished pigment in terms of the amounts admixed with the raw alkaline earth metal sulfide or sulfides prior to heat treatment. Expressed thus in weight per cent based on the total weight of alkaline earth metal sulfide or sulfides in the mixture prepared for heat treatment, the optimum and useful ranges of the two activators are as follows:

|  | Optimum range | Useful range |
| --- | --- | --- |
| Copper (calculated as Cu) | 0.0031–0.0055 | 0.0005–0.007 |
| Bismuth (calculated as Bi) | 0.015–0.017 | 0.005–0.028 |

In straight bismuth-activated phosphors, phosphorescence is at a maximum when the bismuth concentration is close to 0.03% for high calcium phosphors and 0.017% for high strontium phosphors. As hereinbefore explained, these figures are based on the weight of crude alkaline earth metal sulfide (e. g. combined calcium sulfide and strontium sulfide) and are equivalent to one atom of bismuth for each 12,000 molecules of the sulfide or sulfides. When copper is included with bismuth, phosphorescence is at a maximum throughout the period of 1 minute to 8 hours after excitation with copper in the range of 0.0031 to 0.0055% and bismuth in the range of 0.015 to 0.017%. Thus, in these phosphors the weight of copper is about one-third to one-fifth the weight of bismuth. The wider useful ranges of copper and bismuth hereinbefore recited yield phosphors superior to the best straight bismuth-activated phosphors. For example, throughout the entire range of 0.005–0.028% added bismuth, as little as 0.0005% added copper is effective in synergistically decreasing the rate of phosphorescent decay in accordance with the invention. Increasing amounts of copper up to 0.007% are also effective throughout the aforementioned range of bismuth content. Copper contents materially above 0.007% tend to lose their effectiveness and even increase the rate of phosphorescent decay of the bismuth-activated pigment.

Because of the difficulty of uniformly distributing the minute amounts of bismuth and copper salts throughout the pigment mixture, these salts are advantageously those capable of being dissolved in a volatile solvent which has no adverse effect upon the composition of the mixture. Thus, bismuth nitrate, bismuth subnitrate (to which bismuth nitrate largely hydrolyzes in water), bismuth chloride and bismuth citrate may be used as the bismuth compound, and copper nitrate, copper chloride, copper sulfate and copper acetate are examples of suitable copper compounds. The degree of solubility of these compounds in a solvent need not be great because of the minute amounts of these compounds which are effective in the practice of the invention.

The inclusion of fluxes in the mixture prepared for heat treatment is helpful in introducing the activators into the pigment crystals during the heat treatment. Various fluxes may be used without materially altering the improvement obtainable from the added copper activator in these phosphors. Among suitable fluxes for the purpose are alkali metal salts such as, for example, sodium fluoride, sodium carbonate and lithium sulfate. Moreover, any flux combination which is suitable for bismuth-activated phosphors is suitable for copper-bismuth-activated phosphors. Useful flux combinations are lithium sulfate-sodium carbonate, sodium fluoride-lithium sulfate, sodium fluoride-potassium acid sulfate, etc. In large scale operations the flux combination is of greater importance because of its effect on the hardness of the sintered pigment aggregate and the recovery of useful pigment. The amount of single flux or flux combination included in the mixture is relatively small, being generally about 1–2% by weight based on the weight of the mixture.

Elemental sulfur, say about 5% by weight, and magnesium oxide, also around 5% by weight, may also be advantageously included in the mixture. Sulfur stabilizes the sulfide pigments and also protects the mixture from oxidation during the heat treatment, and magnesium oxide inhibits any tendency of the mixture to fuse or sinter. In addition, the mixture may advantageously include a reducing agent readily decomposable by heat, such as starch.

Various salts or oxides of the activating metals (copper and bismuth) may be added separately or together to different ingredients of the crude mix without appreciably affecting the phosphorescent properties of the finished pigment. The preferred method of mixing is to grind the activators into the flux with a little alcohol, add the crude calcium sulfide and strontium sulfide and grind to a uniform mix, and finally magnesia is ground in. The alcohol is allowed to evaporate, then sulfur and starch are ground in. In large scale practice for the manufacture of copper-bismuth-activated pigments, all of the ingredients, except the calcium sulfide and strontium sulfide, may be advantageously sprayed with a water solution of the activators, then dried and mixed with the calcium sulfide and strontium sulfide.

The compositions of a typical series of phosphors of the invention are given below, the various constituents being expressed in terms of the amount included in the crude mixture prepared for heat treatment:

|  | Grams |
| --- | --- |
| Copper nitrate .3H$_2$O | 0.0012 |
| Calcium sulfide | X |
| Sulfur | 0.12 |
| Bismuth subnitrate .H$_2$O | 0.0024 |
| Strontium sulfide | Y |
| Sodium carbonate | 0.36 |
| Lithium sulfate | 0.18 |
| Magnesia | 0.40 |
| Sulfur | 0.89 |
| Starch (rice or corn) | 0.44 |

In this series of phosphors the ratio of calcium sulfide to strontium sulfide (CaS:SrS) was varied from 100:0 to 0:100, keeping the total weight X plus Y constant at 10 grams. The 0.0012 gram of copper nitrate (Cu(NO$_3$)$_2$.3H$_2$O) and 0.0024 gram of bismuth subnitrate (BiONO$_3$.H$_2$O) are equivalent to 0.00316% Cu and 0.0164% Bi, respectively, based on the combined weight of the calcium and strontium sulfides. The constituents were thoroughly mixed in a wooden vat provided with a stainless steel spiral ribbon mixer. The activators are conveniently added by spraying onto the mixture a solution of their respective salts in water, alcohol, acetone or other suitable solvent. The mixtures were muffled at a temperature of 1075° C. for 40 minutes, then ground and remuffled at the same temperature and for the same time, and finally carefully ground. The following table compares the phosphorescent brightness (in micro-lamberts) of this series of phosphors of the invention (A) with similar straight bismuth-activated phosphors (B) activated with 0.028% Bi, and indicates the superior brightness (per cent improvement) of the former. The pigments, each incorporated in the same nitrocellulose lacquer and applied to panels for test purposes, were excited to phosphorescence by exposure for one minute to 600 foot candle illumination from a Mazda lamp. Infrared light was filtered from this illumination by a water cell interposed between the lamp and the pigment.

Table I

| | Phosphorescent Brightness | | Per Cent Improvement |
|---|---|---|---|
| | A | B | |
| 1. CaS:SrS=100:0 Time after excitation: | | | |
| 1 Minute | 77 | 22 | 250 |
| 30 Minutes | 1.30 | 0.57 | 128 |
| 1 Hour | 0.56 | 0.27 | 107 |
| 3 Hours | 0.14 | 0.074 | 89 |
| 8 Hours | 0.035 | 0.023 | 52 |
| 2. CaS:SrS=80:20 Time after excitation: | | | |
| 1 Minute | 52 | 38 | 37 |
| 30 Minutes | 3.95 | 1.45 | 172 |
| 1 Hour | 1.85 | 0.65 | 185 |
| 3 Hours | 0.61 | 0.29 | 110 |
| 8 Hours | 0.28 | 0.10 | 180 |
| 3. CaS:SrS=70:30 Time after excitation: | | | |
| 1 Minute | 63 | 38 | 66 |
| 30 Minutes | 4.3 | 1.9 | 126 |
| 1 Hour | 2.0 | 0.70 | 186 |
| 3 Hours | 0.72 | 0.30 | 140 |
| 8 Hours | 0.29 | 0.14 | 107 |
| 4. CaS:SrS=60:40 Time after excitation: | | | |
| 1 Minute | 67 | 50 | 34 |
| 30 Minutes | 4.35 | 1.9 | 129 |
| 1 Hour | 2.2 | 0.78 | 182 |
| 3 Hours | 0.75 | 0.29 | 159 |
| 8 Hours | 0.30 | 0.13 | 131 |
| 5. CaS:SrS=50:50 Time after excitation: | | | |
| 1 Minute | 65 | 48 | 35 |
| 30 Minutes | 4.3 | 1.8 | 139 |
| 1 Hour | 2.0 | 0.70 | 186 |
| 3 Hours | 0.79 | 0.24 | 229 |
| 8 Hours | 0.31 | 0.11 | 182 |
| 6. CaS:SrS=20:80 Time after excitation: | | | |
| 1 Minute | 65 | 63 | 3 |
| 30 Minutes | 3.6 | 3.5 | 3 |
| 1 Hour | 1.85 | 1.35 | 37 |
| 3 Hours | 0.63 | 0.46 | 37 |
| 8 Hours | 0.24 | 0.14 | 71 |
| 7. CaS:SrS=0:100 Time after excitation: | | | |
| 1 Minute | 91 | 86 | 6 |
| 30 Minutes | 1.5 | 1.3 | 15 |
| 1 Hour | 0.68 | 0.50 | 36 |
| 3 Hours | 0.18 | 0.095 | 90 |
| 8 Hours | 0.053 | 0.020 | 165 |

It will be seen from the foregoing table that throughout the full range of combinations of calcium sulfide and strontium sulfide, from calcium sulfide alone to strontium sulfide alone, the presence of both copper and bismuth as activators is superior to bismuth as a single activator. It will also be noted that the improvement in phosphorescent brightness of the foregoing phosphors of the invention is generally of the order of 100–200% during the period of 30 minutes to 8 hours after excitation. This is particularly advantageous because it means that pigments of the invention retain better luminosity over an eight-hour period than do prior art pigments. Inasmuch as the uses to which phosphorescent pigments are customarily put involves excitation during the hours of daylight and luminosity is desired throughout the following hours of darkness, the effective retention of overnight luminosity by the pigments of the invention is particularly advantageous.

The double activation of calcium sulfide and strontium sulfide, and of mixtures thereof, is not due merely to the additive effects of the two individual activators. This can be seen clearly from the foregoing table in which pigments containing 0.0164% bismuth and 0.00316% copper (a total of 0.0196% combined activators) show a marked increase in phosphorescent brightness over corresponding prior art pigments which contained about 70% more bismuth (0.028%) and no copper. This improvement has been observed where pigments containing the combined bismuth and copper activators have been compared with corresponding pigments containing the same amount of bismuth as a single activator without the copper. Such improvement appears at different levels of bismuth concentration throughout the entire useful range in accordance with the invention. The following examples are illustrative and show, under uniform test conditions reported for Table I, the improvement at various levels of bismuth concentration with a pigment comprising calcium sulfide alone. The same general order of improvement appears with all variations in calcium sulfide to strontium sulfide ratios from calcium sulfide alone to strontium sulfide alone.

Table II

| 1. Per cent Bi | 0.0164 | 0.0164 |
|---|---|---|
| Per cent Cu | 0.00316 | None |

| Time After Excitation | Microlamberts | | Per Cent Improvement |
|---|---|---|---|
| 1 Minute | 77 | 22 | 250 |
| 30 Minutes | 1.30 | 0.64 | 103 |
| 1 Hour | 0.56 | 0.31 | 81 |
| 3 Hours | 0.14 | 0.10 | 40 |
| 8 Hours | 0.035 | 0.035 | 0 |

| 2. Per cent Bi | 0.0164 | 0.028 |
|---|---|---|
| Per cent Cu | 0.00316 | None |

| Time After Excitation | Microlamberts | | Per Cent Improvement |
|---|---|---|---|
| 1 Minute | 77 | 22 | 250 |
| 30 Minutes | 1.30 | 0.57 | 128 |
| 1 Hour | 0.56 | 0.27 | 107 |
| 3 Hours | 0.14 | 0.074 | 89 |
| 8 hours | 0.035 | 0.023 | 52 |

| 3. Per cent Bi | 0.028 | 0.028 |
|---|---|---|
| Per cent Cu | 0.00316 | None |

| Time After Excitation | Microlamberts | | Per Cent Improvement |
|---|---|---|---|
| 1 Minute | 58 | 22 | 164 |
| 30 Minutes | 1.1 | 0.57 | 93 |
| 1 Hour | 0.51 | 0.27 | 89 |
| 3 Hours | 0.142 | 0.074 | 92 |
| 8 Hours | 0.043 | 0.023 | 87 |

Instead of using the sulfides of calcium and strontium, the desired mixture of the two sulfides may be formed in situ by calcining calcium oxide and strontium carbonate with sufficient sulfur to sulfidize these compounds. During this calcining the calcium and strontium compounds are transformed into the corresponding sulfides with the result that during an effective portion of the calcining period the mixture comprises calcium sulfide and strontium sulfide and contains the bismuth and copper salts. The following formulations are examples of such phosphors of the invention:

| Example | I | II | III | IV |
|---|---|---|---|---|
| CaS: SrS (approx.) | 70:30 | 60:40 | 50:50 | 20:80 |
| | Grams | Grams | Grams | Grams |
| Bismuth subnitrate.$H_2O$ | 0.0023 | 0.0021 | 0.0017 | 0.0035 |
| Strontium Carbonate | 3.53 | 4.50 | 5.75 | 9.48 |
| Lithium Sulfate | 0.11 | 0.11 | 0.12 | 0.13 |
| Sodium carbonate | 0.22 | 0.23 | 0.24 | 0.26 |
| Sulfur | 3.68 | 3.80 | 4.00 | 5.28 |
| Copper nitrate .$3H_2O$ | 0.0011 | 0.0010 | 0.0008 | 0.00036 |
| Calcium oxide | 5.55 | 4.93 | 4.15 | 1.80 |
| Magnesia | 0.44 | 0.45 | 0.48 | 0.54 |
| Starch | 1.40 | 1.44 | 1.52 | |
| Urea | | | | 2.44 |

In the foregoing examples I, II, III and IV, the per cent Bi was respectively 0.016, 0.014, 0.012 and 0.024, the per cent Cu was respectively 0.0029, 0.0026, 0.0021 and 0.0009, based on the combined weight of crude calcium and strontium sulfides, and the actual CaS:SrS ratio was respectively 71.3:28.7, 63.5:36.5, 53.4:46.6 and 23.2:76.8. In the 20:80 phosphor (Example IV), 84.2% of the sulfur was added to the strontium carbonate mix and 15.8% of the sulfur was added to the calcium oxide mix.

The following table illustrates the improvement in phosphorescent brightness of a 70 Ca:30 Sr phosphor of the invention (A) made from specially purified strontium carbonate and calcium oxide and activated with 0.0166% Bi and 0.0033% Cu compared with a similarly prepared straight bismuth-activated phosphor (B) activated with 0.017% Bi.

| Time after excitation | Phosphorescent Brightness | | Per Cent Improvement |
|---|---|---|---|
| | A | B | |
| 1 minute | 52 | 31 | 68 |
| 30 Minutes | 3.65 | 1.3 | 181 |
| 1 Hour | 2.15 | 0.71 | 203 |
| 3 Hours | 0.73 | 0.26 | 181 |
| 8 Hours | 0.28 | 0.11 | 155 |

In general, I prefer to incorporate the bismuth activator in the strontium carbonate mix and the copper activator in the calcium oxide mix, as indicated in the foregoing formulations. If not so separately incorporated, I then prefer to incorporate both activators in the strontium carbonate mix. I also prefer to dissolve the activators in water, rather than alcohol, acetone, etc. The strontium carbonate and calcium oxide mixes are thoroughly mixed together, sifted or screened and subjected to the heat treatment. The heat treated product, after cooling, is pulverized carefully without using hard pressure, and the thus-pulverized product is sifted or screened to the desired particle size.

While the phosphors of the invention are preferably composed for the most part of calcium sulfide and strontium sulfide in ratios varying from 80:20 to 20:80, activation with bismuth and copper in accordance with the invention effects a substantial improvement in the phosphorescent brightness of phosphors composed for the most part or entirely of either calcium sulfide or strontium sulfide.

This application is a continuation in part of my copending application Serial No. 608,353, filed August 1, 1945, and now abandoned.

I claim:

1. A phosphorescent pigment comprising the product of heat treating at 900° to 1300° C. a mixture consisting essentially of an alkaline earth metal sulfide of the group consisting of calcium sulfide and strontium sulfide and containing minute amounts of a bismuth salt and a copper salt such as to comprise about 0.005–0.028% bismuth and 0.0005–0.007% copper by weight of the sulfide, said heating being continued for a sufficient period of time to effect diffusion of the bismuth and copper throughout the pigment.

2. A phosphorescent pigment comprising the product of heat treating at 900° to 1300° C. a mixture consisting essentially of an alkaline earth metal sulfide of the group consisting of calcium sulfide and strontium sulfide and containing minute amounts of a bismuth salt and a copper salt such as to comprise about 0.015–0.017% bismuth and 0.0031–0.0055% copper by weight of the sulfide, said heating being continued for a sufficient period of time to effect diffusion of the bismuth and copper throughout the pigment.

3. A phosphorescent pigment comprising the product of heat treating at 900° to 1300° C. a mixture consisting essentially of calcium sulfide and containing minute amounts of a bismuth salt and a copper salt such as to comprise about 0.005–0.028% bismuth and 0.0005–0.007% copper by weight of the sulfide, said heating being continued for a sufficient period of time to effect diffusion of the bismuth and copper throughout the pigment.

4. A phosphorescent pigment comprising the product of heat treating at 900° to 1300° C. a mixture consisting essentially of strontium sulfide and containing minute amounts of a bismuth salt and a copper salt such as to comprise about 0.005–0.028% bismuth and 0.0005–0.007% copper by weight of the sulfide, said heating being continued for a sufficient period of time to effect diffusion of the bismuth and copper throughout the pigment.

5. A phosphorescent pigment comprising the product of heat treating at 900° to 1300° C. a mixture consisting essentially of calcium sulfide and strontium sulfide in ratios varying from 80:20 to 20:80 and containing minute amounts of a bismuth salt and a copper salt such as to comprise about 0.005–0.028% bismuth and 0.0005–0.007% copper by weight of the sulfide, said heating being continued for a sufficient period of time to effect diffusion of the bismuth and copper throughout the pigment.

6. A phosphorescent pigment comprising the product of heat treating at 900° to 1300° C. a mixture consisting essentially of calcium sulfide and strontium sulfide in ratios varying from 80:20 to 20:80 and containing minute amounts of a bismuth salt and a copper salt such as to comprise about 0.015–0.017% bismuth and 0.0031–0.0055% copper by weight of the sulfide, said heating being continued for the sufficient period of time to effect diffusion of the bismuth and copper throughout the pigment.

7. A phosphorescent pigment comprising the product of heat treating at 900° to 1300° C. a mixture consisting essentially of an alkaline earth metal sulfide of the group consisting of calcium sulfide and strontium sulfide and containing a bismuth salt, a copper salt, a flux comprising about 1–2% by weight of an alkali metal salt, and about 5% by weight of sulfur, the amount of said bismuth salt and copper salt being such as to comprise about 0.005–0.028% bismuth and 0.0005–0.007% copper by weight of the sulfide, said heating being continued for a sufficient period of time to effect diffusion of the bismuth and copper throughout the pigment.

FERDINAND STERN.

REFERENCES CITED

The following references are of record in the file of this patent:

UNITED STATES PATENTS

| Number | Name | Date |
|---|---|---|
| 2,285,464 | Ruthruff | June 9, 1942 |

OTHER REFERENCES

Nichols et al.: "Cathodoluminescence and the Luminescence of Incandescent Solids," pages 8, 13 and 107.

Lenard et al.: "Handbuch der Experimental Physik," 1928, vol. XXIII, part 1, pages 332–338, 350, 351, 363 and 375.

Certificate of Correction

Patent No. 2,475,437

July 5, 1949

FERDINAND STERN

It is hereby certified that errors appear in the printed specification of the above numbered patent requiring correction as follows:

Column 8, line 43, for the words "for the" read *for a*; same column, line 70, list of references cited, beginning with "Nichols et al." strike out all to and including "107" in line 72, and insert instead *Nichols, Howes and Wilber: "Cathodo-Luminescence and the Luminescence of Incandescent Solids," Publication—Carnegie Institute of Washington, 1928, page 107*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*